March 26, 1963

W. R. McKAY 3,082,830

DISC HARROW

Filed Sept. 30, 1960

INVENTOR.
WILLIAM R. McKAY
BY *Cohn and Powell*

ATTORNEYS.

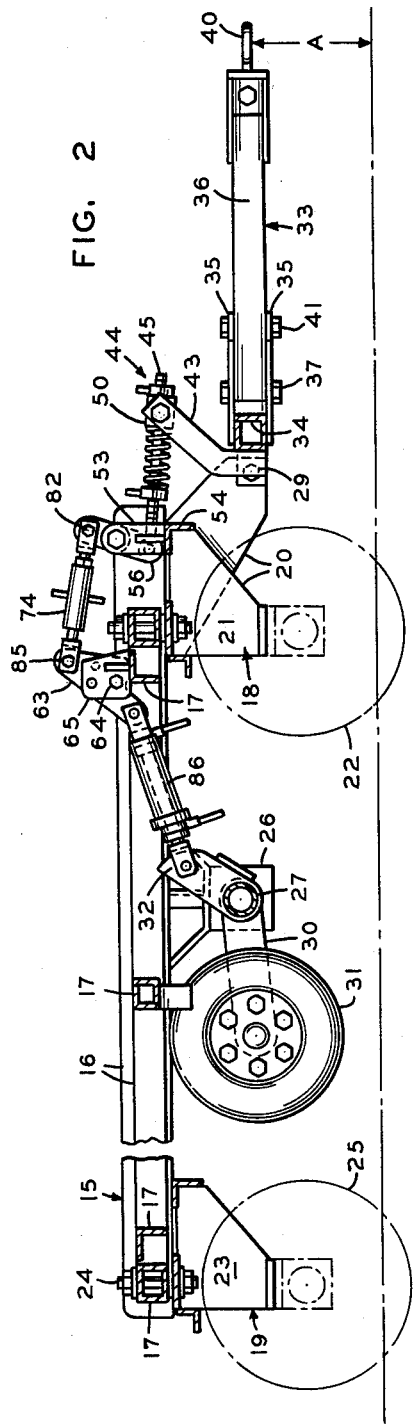

March 26, 1963 W. R. McKAY 3,082,830
DISC HARROW

Filed Sept. 30, 1960 4 Sheets-Sheet 3

INVENTOR.
WILLIAM R. McKAY
BY Cohn and Powell
ATTORNEYS.

United States Patent Office 3,082,830
Patented Mar. 26, 1963

3,082,830
DISC HARROW
William R. McKay, Compton, Calif., assignor to Alexander Manufacturing Company, Picayune, Miss., a corporation of Mississippi
Filed Sept. 30, 1960, Ser. No. 59,769
7 Claims. (Cl. 172—328)

This invention relates generally to improvements in a disc harrow, and more particularly to an improved mechanism for leveling the rigid frame of an offset disc harrow.

The heretofore conventional rigid frame "wheel type" offset disc harrow consisted of a main frame upon which were mounted two sets of disc gangs, a vertically pivotal hitch tongue, an adjustable spring loaded, hitch tongue positioner, and a hydraulically controlled ground wheel assembly.

In this unit the wheels serve a dual purpose. When the wheels are lowered by the hydraulic ram, the gangs are lifted above the ground level and the implement may be easily transported into or out of the field, or along a highway. When the hydraulic ram is retracted, the wheels are elevated so that the gangs are relatively lowered to a cutting position.

The hitch tongue must pivot vertically to provide a non-rigid connection between the tractor and implement in order to allow the tractor relative vertical movement in operation over rough ground, ridges or furrows. A spring loaded, adjustable sliding bar is usually provided so that downward pressure may be applied to the hitch tongue. This device serves as a means for decerasing the downward pressure of the front gang, thus limiting its cutting penetration during operation in soft or easily cut soil. This device also serves as a frame leveller by adjusting the position of the hitch tongue to accommodate different heights of the drawbar during transport.

It is obvious that as the frame rises, the front or hitch point end of the hitch tongue must move relatively downward about its pivot connection with the frame in order to level the frame for transport. Heretofore, the spring loaded positioner has been used for this purpose. However, this usage necessitates readjustment of the spring tension each time the frame is leveled for transport or position for cutting operation. This is a time consuming procedure, and usually requires several experimental settings by the operator to achieve again the initial and proper setting of the spring tension for correct operation in cutting.

It is a major objective of this invention to provide an automatic control that will increase the pressure or spring tension of the hitch tongue positioner, and thereby relatively lower the hitch tongue about its pivot connection with the frame as the frame rises for transport; and which will correspondingly decrease the spring tension of the positioner and return the hitch tongue to its initial position when the frame is subsequently lowered for cutting operation.

Another important objective is realized by providing a means that operatively interconnects the ground wheels with the hitch tongue so that such tongue is raised or lowered respectively upon lifting or lowering the wheels.

Other important advantages are afforded by the provision of a fluid-actuated means including a piston and a coacting cylinder operatively connected to the wheels and to the hitch tongue so that the piston stroke actuates the wheels and causes a corresponding actuation of the hitch tongue, whereby to maintain the frame level.

Another important object is achieved by the provision of a lock device that selectively fixes the hitch tongue in either a raised or lowered position, and enables the fluid actuated means to be removed or the feed line uncoupled therefrom, such situation being particularly advantageous while transporting the unit by truck or other towing means. Moreover, locking of the linkage, that interconnects the fluid-actuated means with the hitch tongue, under cutting conditions assures that maximum lift of the frame by the wheels is maintained regardless of the extent of the vertical oscillation of the hitch tongue.

Still another important object is realized by providing a rigid frame to which ground wheels and a hitch tongue are pivoted, by providing a hitch tongue positioner including a resilient loading means that tends to urge the tongue downwardly, and by providing a hydraulic means including a piston element and a cylinder element, one of the elements being operatively connected to the wheels and the other element being operatively interconnected with the hitch tongue positioner so that the hydraulic means tends to raise or lower the wheels and respectively raise or lower the hitch tongue upon decreasing or increasing the loading force exerted by the resilient means.

Yet another important object is achieved by the provision of a pair of levers pivoted to the frame, the hydraulic mechanism being attached to one lever while the hitch tongue positioner is attached to the other lever, such levers being interconnected by a link so as to transmit the force of the hydraulic means to the positioner in a manner so that the resilient force on the tongue is decreased or increased as the wheels are respectively lifted or lowered.

Another important object is provided by locking one of the levers to the frame so as to maintain the predetermined adjusted resilient force exerted by the hitch tongue positioner on the hitch tongue, with all of the attendant functional advantages discussed previously for transportation and cutting operation.

An important objective is afforded by the structural arrangement of parts which enables the fluid actuated mechanism to raise or lower the wheels fully and through appropriate linkage to raise or lower the hitch tongue.

It is an important object of the invention to provide an automatic control in an offset disc harrow of this type which is simple and durable in construction, economical to manufacture, efficient in operation, and which can be utilized by any one with little or no instruction.

The foregoing and numerous other objects and advantages of the invention will more clearly appear from the following detailed description of a preferred embodiment, particularly when considered in connection with the accompanying drawings, in which:

FIG. 2 is a cross sectional view as seen along staggered line 2—2 of FIG. 1, illustrating the wheels in a fully raised position;

FIG. 3 is a view similar to FIG. 2, but illustrating the wheels in a fully lowered position;

Figure 1:
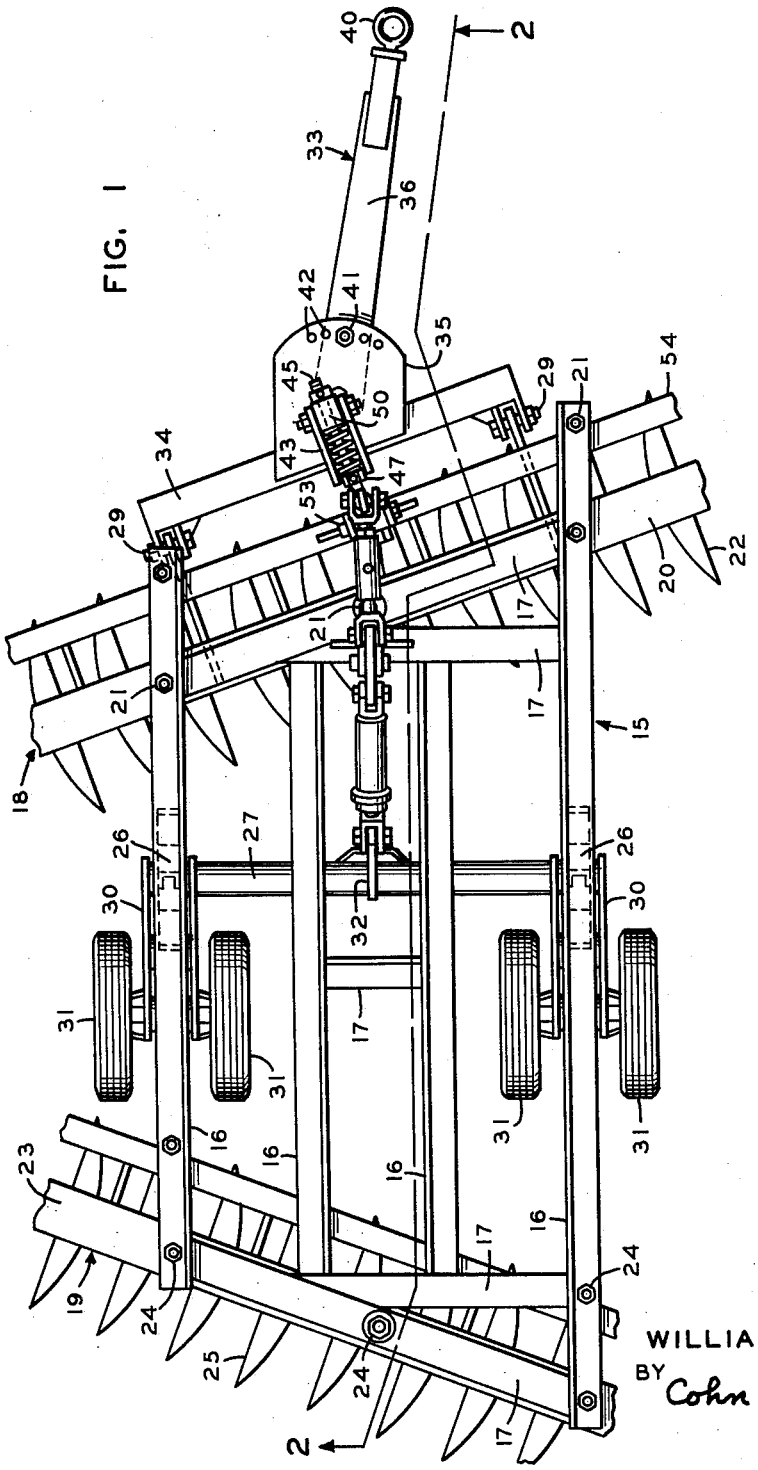
FIG. 1 is a top plan view of the disc harrow.
Figure 4:
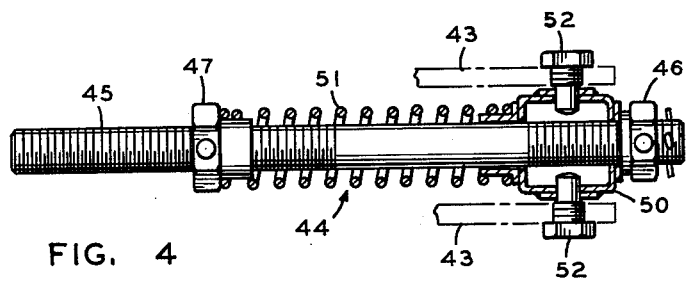
FIG. 4 is a top plan view, partly in cross section of the hitch tongue positioner.
Figure 5:
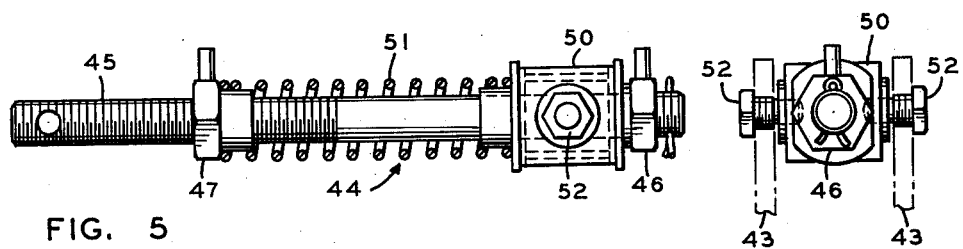
FIG. 5 is a side elevational view of the hitch tongue positioner shown in FIG. 4.
Figure 6:
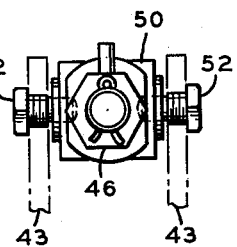
FIG. 6 is an end elevational view of the hitch tongue positioner as seen from the right of FIG. 5.

Referring now by characters of reference to the drawings, and first to FIG. 1, it is seen that the offset disc harrow includes a rigid frame generally indicated at 15, constructed of a plurality of longitudinal frame members 16 that are interconnected by a plurality of cross frame members 17. The rigid frame 15 is disposed normally in a horizontal plane as is best shown in FIGS. 2 and 3.

A pair of gangs indicated at 18 and 19 are attached to and carried by the main frame 15. The front gang 18 includes frame members 20 extending transversely below the main frame 15. A nut and bolt structure 21 fixes the gang frame to the main frame 15. As is conventional, a plurality of cutting discs 22 are carried by the gang frame 20, the discs 22 all facing toward one side of the disc harrow and adapted to throw earth to that side. The front gang 18 is angularly related relative to the direction of pull or line of draft so that the right side leads the left side.

The rear gang 19 is similarly constructed in that a gang frame 23 extends transversely of the main frame 15 and is secured to the rearmost cross frame members 17 of the main frame 15 by a bolt and nut structure 24. Similarly, a plurality of discs 25 are carried by the gang frame 23, such discs facing toward the opposite side of the harrow. In addition, the gang 19 is angularly related to the direction of pull so that the left side leads the right side.

Mounted below the longitudinal frame members 16 at each side of the harrow is a pillow block bearing 26. Rotatively mounted in bearings 26 is a rock shaft 27. At each end of the rock shaft 27, a leg structure 30 is attached. A pair of ground wheels 31 are rotatively mounted and carried by the free end of each leg structure 30.

Upon rotation or oscillation of rock shaft 27, the ground wheels 31 can be lifted to the fully retracted position illustrated in FIG. 2 or lowered to the fully extended position illustrated in FIG. 3. Cooperating with the mechanism for actuating the ground wheels 31, there is an arm 32 that is fixed to and extends above rock shaft 27. The arm 32 is located medially of the harrow frame 15 and at the center of rock shaft 27.

Disposed at the forward end of the main harrow frame 15 is a hitch tongue assembly referred to at 33 that is adapted to interconnect the harrow and the tractor operatively for towing either during transport or cutting operation. The hitch tongue assembly 33 includes a U-shaped frame 34, the outer ends of which are pivotally attached by pins 29 to plate arms attached to and extending forwardly of the front gang frame 20. The pivot pins 29 permit vertical oscillating movement of frame 34.

A pair of plates 35 are attached to the U-shaped frame 34, one of such plates being located at the top and at the bottom of frame 34 and held in vertically spaced relation. A hitch tongue 36 is disposed between the plates 35 and pivotally attached to such plates by a vertical pivot pin 37. The forward end of tongue 36 is provided with a hitch eye 40 and is adapted to be attached to a tractor.

To locate the position of hitch tongue 36 accurately, the tongue 36 is pinned to the spaced plates 35 by a bolt 41. The bolt 41 is capable of interfitting any one of a plurality of apertures 42 arranged in arcuate alignment in plates 35. The position of the hitch tongue 36 can be readily adjusted merely by inserting the bolt 41 into the appropriate aperture 42.

An arm 43 consisting of a pair of spaced straps is fixed at one end to the U-shaped frame 34, the arm 43 extending upwardly above the plates 35.

The hitch tongue positioner generally indicated at 44 includes a threaded rod 45 and a pair of spaced collars 46 and 47 threadedly attached to the rod 45. Located between the collars 46 and 47 and slidably mounted on rod 45 is a trunnion 50. A compression spring 51 is disposed about rod 45 and has one end engaging the trunnion 50 and the opposite end engaging collar 47. The spring 51 tends to urge the trunnion 50 in a forward direction. A pivot pin 52 is carried by trunnion 50 and attaches the trunnion to the arm 43. More particularly, the trunnion 50 is located between the spaced parallel straps constituting the arm 43. Consequently, the loading of spring 51 tends to exert a downward force on the hitch frame 34, and thereby tends to move the hitch tongue 36 downwardly about the pivot pins 29.

As is best seen in FIGS. 2, 3, 8, 9 and 10, a bracket 53 is fixed to frame member 54. Located within bracket 53 and pivotally attached to such bracket by pin 55 is a front lever 56. The lower end of front lever 56 is provided by a pair of spaced parallel arms 57 adapted to embrace one end of positioner bar 45. The bar 45 is pivotally connected to the lever arms 57 by pin 60. The upper end of lever 56 is provided by a single arm 61 having a socket adapted to rotatively receive a universal bearing 62, the purpose of which will be described subsequently.

Another lever 63 is located behind the front lever 56 and is pivotally mounted by pin 64 in a bracket 65 attached to the top of one of the cross frame members 17 of the main frame 15. The upper end of rear lever 63 mounts a universal ball bearing 66 similar to the bearing 62 retained on the front lever 56.

A locking pin 67 is carried by a chain 70 anchored to the fixed bracket 65. The pin 67 is adapted to be inserted through aligned apertures 71 formed in bracket 65 and hence inserted selectively into either one of a pair of holes 72 and 73 formed in rear lever 63. The rear lever 63 is latched by pin 67 in either one of two pivoted positions, the reasons for which will appear later.

Figure 7:
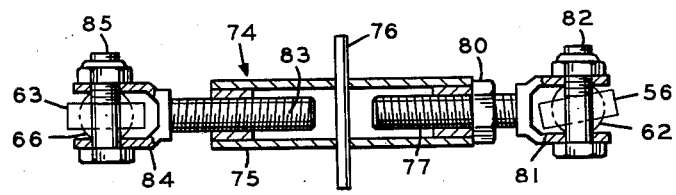
FIG. 7 is a cross sectional view of the turnbuckle.
Figure 10:
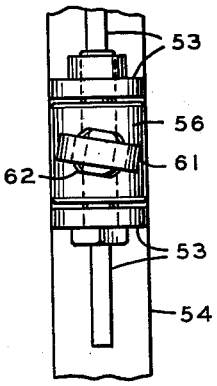
FIG. 10 is a top plan view of the front lever shown in FIG. 8.
Figures 8, 9:
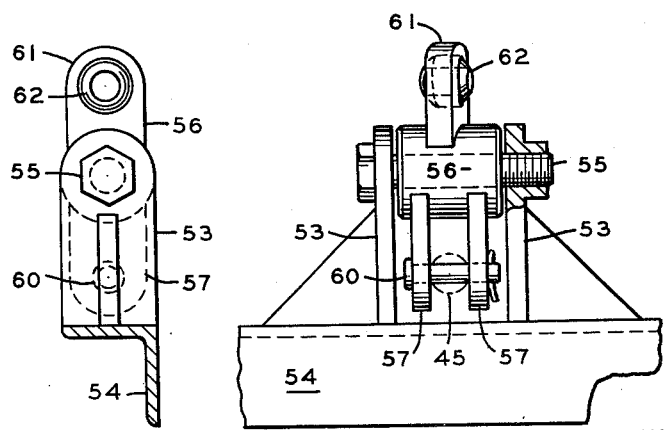
FIG. 8 is a rear elevational view of the front lever to which the hitch tongue positioner is attached.
FIG. 9 is a side elevational view of the front lever as seen from the left of FIG. 8.
Figure 11:
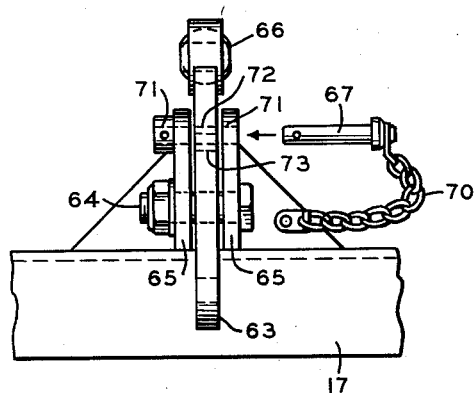
FIG. 11 is a rear elevational view of the rear lever to which the hydraulic means is attached.
Figure 12:
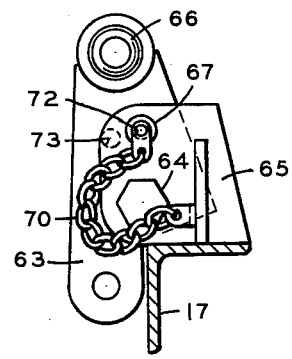
FIG. 12 is a side elevational view, partly in cross section, of the rear lever shown in FIG. 11.
Figure 13:
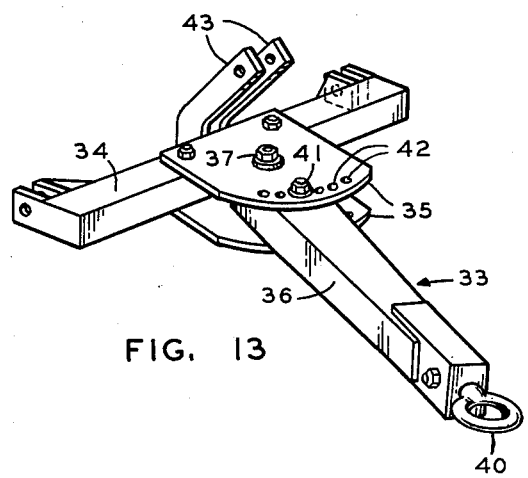
FIG. 13 is a perspective view of the hitch tongue assembly.

Operatively interconnecting the upper ends of levers 56 and 63 is a turnbuckle 74 that constitutes a link. As is best seen in FIG. 7, the turnbuckle 74 includes a cylindrical body 75 through which a wrench pin 76 extends. A rod 77 is threadedly attached to one end of cylindrical body 75 and is fixed in position by nut 80. The outer end of rod 77 includes a bifurcated part 81 that embraces the ball bearing 62 carried by the front lever 56. A bolt 82 extends through the bearing 62 and fixes the bearing to the bifurcated rod part 81.

Threadedly attached to the opposite end of cylindrical body 75 is another rod 83 that also includes a bifurcated outermost part 84. A bolt 85 extends through the ball bearing 66 carried by rear lever 63 and attaches such bearing to the bifurcated rod part 84.

Rotation of the cylindrical body 75 in one direction causes extension of threaded rod 83 and thereby causes a greater spacing between the pivotal connections of levers 56 and 63 as represented by bearings 62 and 66. Conversely, rotation in the opposite direction causes a retraction of threaded rod 83 and thereby causes a shortening of the distance between the pivotal connections 62 and 66 of the levers.

Figure 14:
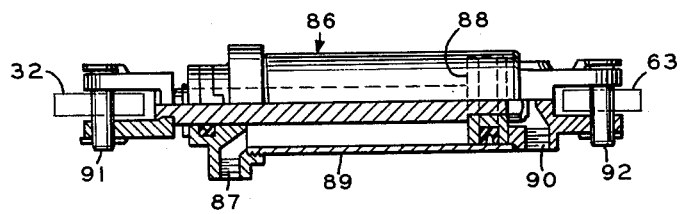
FIG. 14 is an elevational view, partly in cross section, of the hydraulic ram.

A double acting hydraulic ram indicated at 86 is utilized to raise or lower the ground wheels 31. The detailed structure of such ram 86 is perhaps best shown in FIG. 14. When fluid enters the fitting 87, the pressure exerted on one face of piston 88 causes the piston 88 to retract within the cylinder 89. When the fluid flow is reversed and the fluid is introduced into fitting 90, the pressure exerted on the opposite face of the piston 88 causes the piston 88 to be extended.

The piston 88 is pivotally connected by pin 91 to the rock shaft arm 32. The cylinder 89 is pivotally attached by pin 92 to the lower end of rear lever 63.

It is thought that the operation and functional advantages of the automatic control have become apparent from the detailed description of parts, but for completeness of disclosure the operation will be briefly described with reference to lifting and lowering the ground wheels.

It will be assumed that the wheels 31 are fully lifted and that the discs 22 are lowered into cutting position as is shown in FIG. 2. The piston 88 is retracted within cylinder 89, and the spring 51 of the hitch tongue positioner 44 is adjusted so as to maintain the hitch tongue 36 in the horizontal plane as shown and is adjusted so as to exert an appropriate pressure on the front gang 18 to meet a specific soil condition. The hitch eye 40 that is attached to the tractor is maintained at a distance A from the ground.

The spring loading can be adjusted by threadedly manipulating collars 46 and 47 on the rod 45 so as to provide the desired amount of downward pressure on the hitch tongue about the pivot pins 29. This pressure is important in that the reaction through the hitch frame as a result of the fixed position of hitch eye 40 on the tractor serves to decrease the downward pressure on the front gang 18 and thus limits the cutting ability of such gang 18 during operation in soft or easily cut soil. The loading of the spring 51 can also be effected to a limited degree by manipulation of turnbuckle 74. However, it will be readily realized from the previous discussion of this matter that once the spring loading is accurately determined for a particular cutting or soil condition, it is desirable to maintain this setting of the spring loading.

To condition the harrow for transport, the hydraulic ram 86 is actuated by introducing fluid through fitting 90 which causes extension of piston 88. As the piston 88 is extended, the wheels 31 swing downwardly from the fully retracted position shown in FIG. 2 into engagement with the ground. Upon engagement of the wheels 31 with the ground, the piston stroke operates simultaneously to lower the wheels 31 fully to the position shown in FIG. 3, and to pivot the rear lever 63 in a counterclockwise direction (FIG. 3), and thence pivot the front lever 56 in a counterclockwise direction. The front lever 56 correspondingly moves the rod 45 forwardly, tending to increase the loading of spring 51 on trunnion 50. This increase in spring loading tends to move the hitch tongue 36 downwardly about the pivot pins 29. Because the forward hitch eye 40 is maintained at the same distance from the ground level as represented by reference arrows A the reaction of the increased spring loading through the hitch frame causes the front end of the main frame 15 to rise sufficiently to maintain the main frame 15 level. The harrow can now be transported over the highway, or over ridges and furrows while being maintained level.

If it becomes necessary to remove the hydraulic ram 86 during transport, the spring loading in the hitch tongue positioner 45 is maintained by pinning the rear lever 63 to the fixed frame bracket 65. More particularly, the locking pin 67 is inserted through aligned bracket openings 71 and lever opening 72. However, some operators prefer to leave the hydraulic ram 86 on the tractor rather than uncouple the hydraulic hose lines. But where the implement is uncoupled from the tractor and transported by a pickup truck or other towing means, it is necessary to pin the rear lever 63 in the manner described in order to maintain a level main frame 15.

When it is desired to lower the implement into cutting position, the hydraulic ram 86 is actuated by introducing fluid through the other fitting 87 so as to cause a retraction of piston 88. This action of piston 88 simultaneously lifts the wheels 31 from the fully extended position shown in FIG. 3 and actuates the hitch tongue positioner 44. For example, actuation of the hydraulic ram causes a clockwise pivotal movement (FIG. 2) of rear lever 63. The turnbuckle 74 interconnecting the levers 56 and 63 causes a corresponding clockwise pivotal movement of front lever 56. The lever 56 moves the positioner rod 45 rearwardly and tends to decrease the loading of spring 51 on trunnion 50, and consequently tends to cause a raising of the hitch tongue 36 about pivot pins 29. The reaction tends to lower the front end of the main frame. It is seen that the main frame 15 is thereby maintained in a level condition.

Importantly, it will be realized that the predetermined loading of spring 51 is exactly the same after the implement has been lowered or returned to the cutting position as it was before the implement was raised to the transport position. There is no need to make any further adjustment of this spring loading after it has once been set for a particular soil condition.

Unless the rear lever 63 is locked in position while the implement is located in maximum cutting position, it is possible for the hitch tongue assembly 33 to oscillate during operation of the implement over rough ground, and consequently would cause a slight oscillation of the wheels 31 if the hitch tongue moves to a point where the loading of spring 51 is less than the counterbalance force provided by the weight of such wheels. In most cases, this action is not undesirable. However, if the operator desires to maintain maximum lift position of wheels 31 regardless of the vertical oscillation of the hitch tongue assembly 33, the locking pin 67 is inserted through aligned bracket apertures 71 and lever opening 73 formed in the rear lever 63.

Although the invention has been described by making detailed reference to a single preferred embodiment, such detail is to be understood in an instructive, rather than in any restrictive sense, many variants being possible within the scope of the claims hereunto appended.

I claim as my invention:

1. In a disc harrow, a frame, disc gangs attached to said frame, a hitch tongue having one end pivoted to the front of said frame and having the other end fixed in height position, ground wheels pivoted to said frame behind said hitch tongue, a hitch tongue positioner pivotally attached to said hitch tongue and connected to the front of said frame ahead of said wheels, said positioner including resilient means tending to urge said hitch tongue downwardly about its pivotal connection to said frame, and actuating means connected to said wheels so as to raise and lower said wheels, said actuating means being connected to said hitch tongue positioner and tending to increase or decrease the force of said resilient means respectively upon lowering or raising said wheels so that the resilient means acts through the hitch tongue so as to maintain the frame level.

2. In a disc harrow, a frame, disc gangs attached to said frame, a hitch tongue having one end pivoted to said frame and having the other end fixed in height position, ground wheels pivoted to said frame behind said hitch tongue, a hitch tongue positioner pivotally attached to said hitch tongue and pivotally attached to the front of said frame ahead of said wheels, said positioner including resilient means tending to urge said hitch tongue downwardly about its pivot connection to said frame, actuating means connected to said ground wheels for lifting or lowering said ground wheels, and means for varying the loading of said resilient means on said hitch tongue pivoted to said frame and operatively interconnecting the hitch tongue positioner with said actuating means for increasing or decreasing the force of said resilient means respectively upon lowering or raising said wheels, and thereby respectively tending to lower or raise said hitch tongue so that the reaction of said resilient means tends respectively to raise or lower the frame and thereby maintain the frame level.

3. In a disc harrow, a frame, disc gangs attached to said frame, a hitch tongue pivoted to the front of said frame, ground wheels pivoted to said frame, a hitch tongue positioner pivotally attached to said hitch tongue and including resilient means tending to urge said hitch tongue downwardly about its pivotal connection to said frame, a first lever and a second lever pivoted to said frame, fluid actuated means connected to one end of said first lever, said positioner being connected to one end of said second lever, means interconnecting the opposite ends of said levers, said fluid actuating means being connected directly to said wheels for raising or lowering said wheels and respectively decreasing or increasing the force of said resilient means, the resilient means causing a reaction through said hitch tongue that tends respectively to lower or raise the front of said frame and thereby maintain the frame level.

4. The combination as recited above in claim 3, but further characterized by the provision of means for locking one of said levers to said frame and thereby locking the wheels in either the raised or lowered position, the resilient means maintaining the frame level through said hitch tongue yet enabling oscillation of said hitch tongue in each said position.

5. In a disc harrow, a frame, disc gangs attached to said frame, a hitch tongue pivoted to the front of said frame, ground wheels pivoted to said frame behind said hitch tongue, a hitch tongue positioner including a rod, a trunnion slidably mounted on said rod and pivotally attached to said hitch tongue, spring means carried by said rod and engaging said trunnion, said spring means tending to urge said hitch tongue downwardly about its pivot connection to said frame, a first lever pivoted to said frame, said rod being pivoted to the lower end of said lever, a second lever pivoted to said frame behind said first lever, a link pivotally interconnecting the upper ends of said first and second levers, hydraulic means including a piston element and a coacting cylinder element, one of said elements being operatively connected to said ground wheels, and the other of said elements being operatively connected to the lower end of said second lever, said piston element and cylinder element operating so that its piston stroke raises or lowers the ground wheels to its fully retracted or fully extended positions, and operating so that its piston stroke pivots said levers to cause respectively a decrease or an increase in the loading of the spring means in said hitch tongue positioner, the spring means causing a reaction through the hitch tongue that tends respectively to lower or raise the front of said frame whereby to maintain the frame level.

6. The combination and arrangement of elements as recited above in claim 5, but further characterized by the provision of means selectively locking one of said levers to said frame in either of two positions so as to maintain the ground wheels in a raised or lowered position and also maintain the frame level by reaction of said spring means, and yet enable pivotal oscillation of said hitch tongue in each position.

7. The combination and arrangement of elements as recited above in claim 5, but further characterized in that said link interconnecting the said levers consists of an adjustable turnbuckle for effectively determining and changing the distance between the upper end of said levers, whereby to provide an adjustment of the spring loading on said hitch tongue positioner and to provide an adjustment of the position of said hitch tongue.

References Cited in the file of this patent

UNITED STATES PATENTS

| | | |
|---|---|---|
| 1,092,358 | Harden | Apr. 7, 1914 |
| 2,340,497 | Thomas | Feb. 1, 1944 |
| 2,691,930 | Forgy | Oct. 19, 1954 |
| 2,967,574 | Morkoski | Jan. 10, 1961 |